J. ROSENTHAL.
APPARATUS FOR PRODUCING X-RAY KINEMATOGRAPHIC PICTURES.
APPLICATION FILED DEC. 27, 1909.
1,059,488. Patented Apr. 22, 1913.
2 SHEETS—SHEET 1.
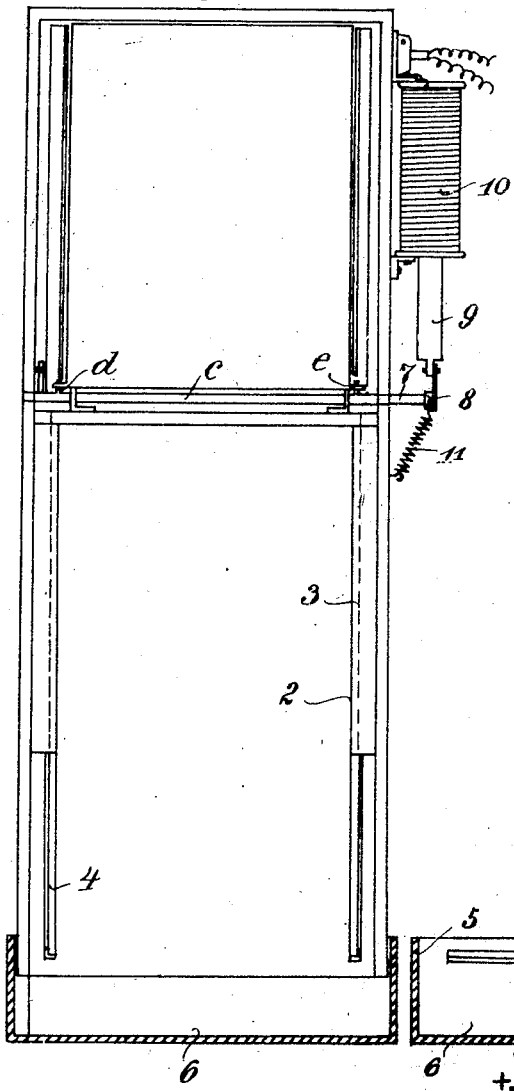
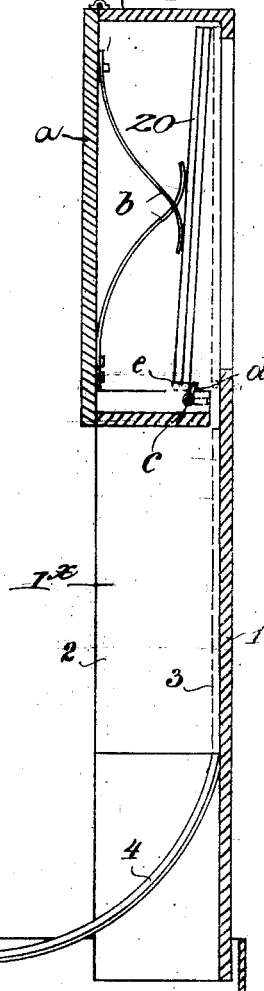
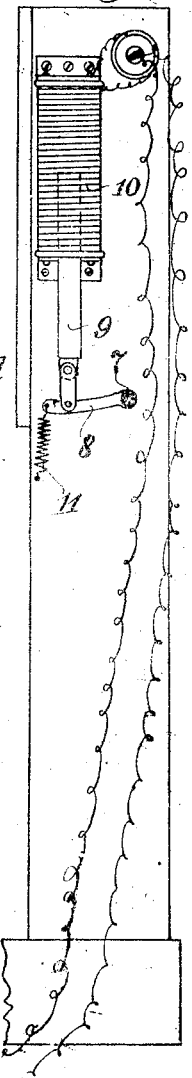
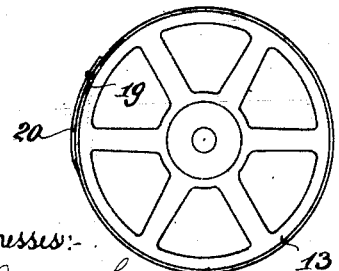
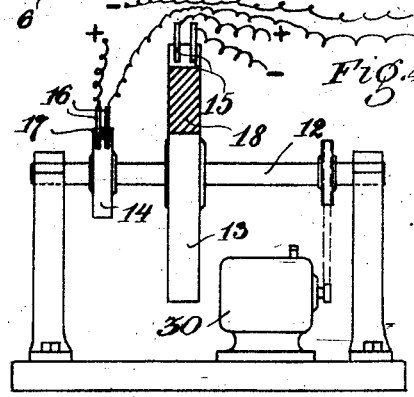

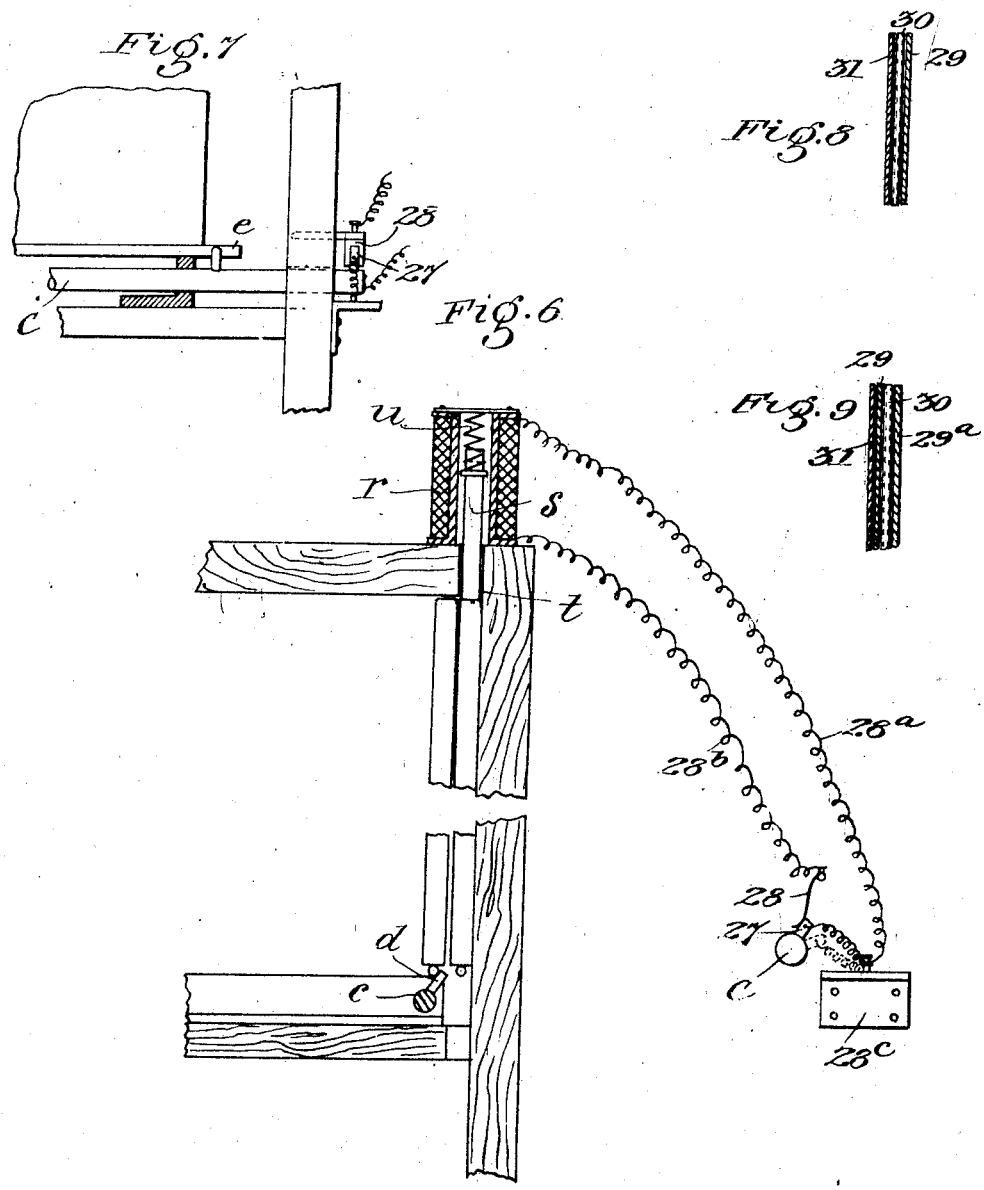

UNITED STATES PATENT OFFICE.

JOSEF ROSENTHAL, OF MUNICH, GERMANY.

APPARATUS FOR PRODUCING X-RAY KINEMATOGRAPHIC PICTURES.

1,059,488.  Specification of Letters Patent.  Patented Apr. 22, 1913.

Application filed December 27, 1909. Serial No. 534,934.

*To all whom it may concern:*

Be it known that I, JOSEF ROSENTHAL, subject of the German Emperor, residing at Munich, in the Kingdom of Bavaria, German Empire, have invented certain new and useful Improvements in Apparatus for Producing X-Ray Kinematographic Pictures, of which the following is a specification.

This invention relates to apparatus for the direct production of X-ray kinematographic pictures.

The principal object of the invention is to provide apparatus by means of which such pictures may be simply, quickly and cheaply produced, employing therefor, plates or films which are successively subjected to the action of the light rays,—each plate or film being exposed for a proper period and after such exposure being removed from the action of the rays.

In substance the invention comprises an apparatus for successively presenting films or plates to the action of light rays and removing the same from the action of such rays, means being also provided for preventing any but the foremost plate or film of a series from being exposed at any one time. Additional means are also provided for conveying the films or plates out of the range of the X-rays and stacking the same in a suitable receptacle. Other features and combinations of elements included in the invention will be hereinafter more fully referred to and specifically pointed out in the subjoined claims.

For the purpose of producing X-ray kinematographic pictures, plates or films of considerably greater dimensions or rather of materially greater bulk are needed than those usable for the ordinary kinematographic pictures, and hence the means employed for the production of the latter would not serve for producing the X-ray pictures. In taking the ordinary kinematographic picture the size of the exposure does not generally exceed one half sq. cm., whereas in producing X-ray kinematographic pictures the exposed surface is at least one hundred times greater. To adapt the means used in producing ordinary kinematographic pictures, *i. e.* perforating the film length laterally or centrally and using the ordinary Maltese cross arrangement, would not be feasible for X-ray kinematographic pictures, as, owing to the materially greater breadth and height and the greater bulk of required material, practical difficulty would be encountered in feeding the single film length forward at sufficient speed and causing its momentary stoppage at the proper time, and in addition to make a length of film of such magnitude would be exceedingly difficult and costly.

Owing to the difficulties attendant upon the use of a single film as above pointed out, it is advisable in producing X-ray kinematographic pictures, to employ a plurality of plate holders, each adapted to contain an individual plate or film of a size suited to the requirements of the occasion. Such individual plates or films cannot, however, be used for taking X-ray kinematographic pictures in the same way as they would be used in an ordinary magazine camera, wherein they are placed one behind the other, the foremost one of the series being exposed and quickly removed and the succeeding plate treated in the same way. In the use of X-rays the treatment would not answer because of the fact that the rays would penetrate the first plate, and affect one or more plates to the rear thereof.

It is the purpose of my invention to provide an apparatus by means of which X-ray kinematographic pictures may be produced by the employment of individual plates or films, each plate being subjected to the X-rays a suitable length of time without any other plate or film being prematurely affected by the rays.

In practising the invention I arrange a plurality of plates or films held in the plate holders in a row and through the action of spring pressure or the like acting upon the row of plate holders, each plate or film is subjected to the action of the X-rays for the requisite period of time. The row of plates is arranged in the exposure chamber, the foremost plate being exposed to the action of the rays and quickly removed to make way for the next succeeding plate to be exposed. The plates must be provided with means for preventing the X-rays from affecting more than one (the foremost) plate in the exposure chamber, and the best method of accomplishing this result is by placing a lead backing plate on each plate or plate holder.

In the accompanying drawing, wherein I have shown apparatus for practising the invention herein referred to, Figure 1 is a front elevational view of a form of apparatus wherein electromagnetic means are employed for actuating the mechanism designed to release the plate holders successively from the exposure chambers; Fig. 2 is a vertical sectional view thereof; Fig. 3 is an elevational view looking toward the right hand side of Fig. 1; Fig. 4 is a front elevational view, partly in section, of the means for supplying current to the X-ray apparatus and to the means for actuating the plate releasing mechanism; Fig. 5 is a side elevational view of a wheel mounted on the shaft of the device of Fig. 4; Figs. 6 and 7 are fragmentary detail views, parts being shown in section, of means employed to accelerate the descent of a plate holder out of the exposure chamber; Figs. 8 and 9 are fragmentary sectional views of means employed to intensify or sharpen the outlines of the pictures to be produced.

As shown in Figs. 1 and 2, the plate holders 20 containing the plates or films are arranged in a row in a light tight receptacle $a$ provided with a door $x$ and are pressed forwardly by a pair of springs $b$. In this form of invention the means for causing the foremost plate to descend quickly out of the exposure compartment or receptacle may be constituted as follows:—Upon each end of a shaft $c$, which may be actuated either electrically or pneumatically, are tongues $d$ against which pins $e$ provided on the plate holders contact when these plate holders are fed forwardly under pressure of the spring $b$. To cause the plate holders to descend the shaft $c$ is turned at a predetermined angle as indicated in Figs. 6 and 7. Through pressure of the spring $b$ the plate holders are pressed forwardly, so that the pins $e$ on the foremost plate holder glide over the forward ends of the tongues $d$. When the shaft is reversely rotated the tongues $d$ enter between the pins $e$ of the foremost plate holders and the pins on its next succeeding plate holder, thus restraining forward movement of the second and succeeding plate holders.

While the pins $d$ move rearwardly between the pins $e$ on the first and second plate holders, the series of plate holders abut and are pressed against the front wall of the casing $a$. It is not possible for the foremost plate holder to descend until those in the rear thereof are pressed backwardly thus relieving the spring pressure on the first plate holder.

To convey the plate holders from the exposure chamber to the receiving chamber 6, I provide between the front wall 1 and the lateral walls $1^x$ of the conduit 2 two guides 3 which near their lower ends are formed as curved guide rails 4, so that the pins $e$ of the descending plate holders first pass downwardly between the guides 3 and are then deflected rearwardly by means of the rails 4 until the lower or rear edges of the plate holders hit against the wall 5 of the receiving receptacle 6 and then fall into the latter. The receiving receptacle is preferably either separate from the remainder of the apparatus or connected thereto yieldingly so that the plate holders will not be detrimentally affected by their impact against the walls of the receptacle 6.

In the form of invention shown in Figs. 1 and 2 the shaft $c$ is rocked by the following means:—The outwardly projecting end 7 of the shaft is connected by means of a lever 8 with the core 9 of a solenoid or electromagnet 10, so that when closing the circuit for the current which also operates to press forward and advance the plate holders, by drawing the core 9 into the solenoid or electromagnet, the lever 8 is actuated to rock the shaft $c$ to the right and when the circuit is opened the core drops and the shaft is rocked in the opposite direction. To enhance the speed of descent of the core 9 and the return of the shaft $c$, I provide a retractile spring 11 which permits a momentary release of the foremost plate through the sudden pressing back of the subsequent plates by means of their pins $e$.

Figs. 4 and 5 illustrate a suitable device for alternately closing and opening the circuit which is utilized for actuating the shaft $c$ as well as for producing the X-rays and this device is so arranged that the operation of the parts may be timed as desired.

Mounted upon a shaft 12 driven by an electric motor 30 or the like are two wheels 13 and 14 the fellies of which present alternately surfaces of conducting and non conducting material. Contacting with each wheel are two spaced springs 15 and 16 (gliding contacts) the first spring on each wheel being electrically connected with the X-ray tubes and the other springs being electrically connected with the solenoid or electromagnet 10. These circuits are only closed when their contacting brushes or springs 15 or 16 contact with the conducting parts of the surface of the wheels 13 and 14. The angular arrangement of the conducting parts of the wheel surfaces is such that during rotation of the wheels 13 and 14 the contact member 16 contacts with the conducting material 17 only after the contact 15 has left the conducting material 18 on the so heel 13, or differently expressed the circuit to the solenoid is closed when the circuit to the X-ray tubes is opened.

To regulate at will the length of time that the current shall flow through the two circuits, or the period of time between closure of the circuit to the X-ray tubes and to the apparatus for actuating the plate holders, I provide upon the current conducting surface of both wheel fellies insulating strips 20 displaceably arranged in slots 19 so that a greater or less area of the conducting surface may be covered with insulating material as shown in Fig. 5.

In both the foregoing forms of invention the plate holders which carry the plates fall out of the exposure chamber through their own weight (specific gravity) after the same have been released from spring pressure by suitable means. The descent of the plate holders after their release may be accelerated by a suitable force acting in the nature of an impact, push, jerk, pull or the like. A force of this kind may be produced mechanically as by a weight or spring, electrically or electromagnetically, pneumatically, etc., and is caused to act against the plate holder, so that when the latter is released the force becomes operative.

Fig. 6 exemplifies illustratively a device working by impact which is caused electrically, this device being shown in combination with the form of invention shown in Figs. 1 to 3, wherein the foremost plate holder is released through the rocking of the shaft $c$ provided with the tongues $d$, the rocking of said shaft being effected by the electromagnet 10.

As shown in Fig. 6 there is placed over the foremost plate holder in the casing of the apparatus an electromagnet $r$ the core $s$ of which projects through a slot $t$ of the casing and is adapted to impact against the plate holder and push it downwardly. The core $s$ of the electromagnet is under influence of an extension spring $u$ and said core $s$ is drawn upward against the tension of the spring $u$ when current traverses the windings of the electromagnet. When the flow of current is interrupted the core is forced downwardly through the unflexing of the spring and impacts against the edge of the plate holder (shown in the drawing at the moment of impact) thus accelerating the descent of the plate holder at the moment the latter has been released by rocking of the shaft $c$ and is in position to descend. To properly time the impact, the current interrupter is actuated by rocking of the shaft $c$ at the moment in which the tongues $d$ have pressed all but the foremost plate rearwardly and have released the latter as shown in Figs. 6 and 7 there is provided on the shaft $c$, exteriorly of the casing $a$, a pin 27 which is so arranged that at the proper time it breaks contact with a spring 28 which is included in the circuit $28^a$, $28^b$ leading from the battery $28^c$ to the electromagnet $r$, in this manner interrupting the flow of current to said electromagnet and thus causing the core piece $s$ to impact against the plate holder at the proper time. Then, as stated above, when the tongues $d$ move forwardly the next succeeding plate holder is advanced, the circuit to the electromagnet is closed and the core $s$ is drawn into the electromagnet.

If, in the production of kinematographic X-ray pictures it is desired to attain particularly sharp effects, it is advisable to press the plate during the exposure between two plane surfaces the one turned toward the rays being permeable by X-rays, and consisting, for example, of thin board or carton. Fig. 8 shows an arrangement wherein 29 is the board or carton, 30 the plate and 31 the lead shield or backing for the plate.

If the surfaces which overlie the plates are made of or are provided with a material which increases the effect of the rays, i. e., a material which through the action of the rays radiates a kind of light to which the photographic film is especially sensitive, or which in addition to the radiation resulting from the original exposure produces additional radiation of the film, it is possible by use of the expedient just described, in addition to increasing the sharpness of effect, to shorten the time of exposure and consequently to take good pictures in poor light, which would be impossible without such auxiliaries. Substances suitable for such purpose are preferably those which show blue fluorescence through exposure, potassium platinum cyanogen for example.

Fig. 9 shows an arrangement of this kind wherein $29^a$ designates a board or carton coated with a suitable radiating substance, 30 is the plate and 31 the lead shield or backing for the plate.

Having thus described my invention, what I claim as new and desire to secure by Letters Patent is:—

1. In a device of the character specified, the combination with an exposure chamber adapted to contain a stack of plate holders each thereof being provided with laterally projecting pins, of a shaft in said chamber having a projecting tongue adapted to engage the pins on the plate holders, and means for rocking said shaft whereby the tongue thereon is alternately moved in opposite directions to release the foremost plate holder from the stack.

2. In a device of the character specified, the combination with an exposure chamber adapted to contain a stack of plate holders each thereof being provided with a laterally projecting pin at each of its lower corners, of a shaft in said chamber having a projecting tongue at each end, said tongues being adapted to engage the pins on the plate holders, and means for rocking said shaft whereby the tongues thereon move in one direction to free the foremost plate holder and move in the opposite direction to compact the stack of plates remaining in the exposure chamber.

3. In a device of the character specified, the combination with an exposure chamber adapted to contain a stack of plate holders each thereof being provided with laterally projecting pins, of means for constantly exerting pressure on the plate holders in the stack, a shaft in said chamber having a projecting tongue adapted to engage the pins on the plate holders, and means for rocking said shaft whereby the tongue thereon moves in one direction to free the foremost plate holder and moves in the opposite direction to compact the stack of plates remaining in the exposure chamber.

4. In a device of the character specified, the combination with an exposure chamber adapted to contain a stack of plate holders each thereof being provided with laterally projecting pins, of a shaft in said chamber having a projecting tongue adapted to engage the pins on the plate holders, a plate receiving receptacle, means for rocking said shaft whereby the tongue thereon will operate to release the foremost plate holder from the stack, and guides for directing the plate so released from the exposure chamber to the receiving receptacle and laying the same flat therein.

5. In a device of the character specified, the combination with an exposure chamber adapted to contain a stack of plate holders each thereof being provided with laterally projecting pins, of a shaft in said receptacle having a projecting tongue adapted to engage the pins on the plate holders, a plate receiving receptacle, means for rocking said shaft whereby the tongue thereon will release the foremost plate holder from the stack, and spaced curved guide rails upon which the pins of released plate holders are adapted to slide whereby said plate holders are caused to fall flat into the receiving receptacle.

6. In a device of the character specified, the combination with an exposure chamber adapted to contain a stack of plate holders each thereof having laterally projecting pins, of a shaft in said chamber having a projecting tongue adapted to engage the pins on the plate holders, means for rocking said shaft whereby the tongue thereon will release the foremost plate holder from the stack, and means adapted to accelerate the motion of the released plate holder out of the exposure chamber.

7. In a device of the character specified, the combination with an exposure chamber adapted to contain a stack of plate holders each thereof having laterally projecting pins, of a shaft in said chamber having a projecting tongue adapted to engage the pins on the plate holders, means for rocking said shaft whereby the tongue thereon will release the foremost plate holder from the stack, means adapted to accelerate the motion of the released plate holder out of the exposure chamber, and means whereby said released plate holders will be guided and laid flat as they pass from the exposure chamber.

8. In a device of the character specified, the combination with an exposure chamber adapted to contain a stack of plate holders each thereof having laterally projecting pins, of a shaft in said chamber having a projecting tongue, and an electromagnet operatively connected with said shaft and adapted to rock the same whereby the tongue thereon will engage the pins on the foremost plate holder and release the same from the stack.

9. In a device of the character specified, the combination with an exposure chamber adapted to contain a stack of plate holders each thereof having laterally projecting pins, of a shaft in said chamber having a tongue adapted to engage the pins on the plate holders, an electromagnet operatively connected with said shaft, and means for alternately closing an electric circuit to said electromagnet and to the X-ray apparatus whereby said shaft will be rocked to release the foremost plate holder at such time as the X-ray apparatus is inoperative, and said shaft will remain stationary when rays are projected against the foremost plate in the exposure chamber.

10. In a device of the character specified, the combination with an exposure chamber adapted to contain a stack of plate holders each thereof having laterally projecting pins, of a shaft in said chamber having a projecting tongue, means for rocking said shaft whereby the tongue thereon will engage the pins on the foremost plate holder and release the same from the stack, and an electromagnet arranged in line with the foremost plate, the core of said electromagnet being operable to impact against said foremost plate holder and accelerate its motion in leaving the exposure chamber.

11. In a device of the character described, the combination with an exposure chamber adapted to contain a stack of plate holders each thereof having laterally projecting pins, of a shaft in said chamber having a tongue adapted to engage the pins on said plate holders, means for rocking said shaft and releasing the foremost plate holder from the stack, means for impacting against the released plate holder to accelerate its motion in leaving the exposure chamber, and means whereby said impact will be timed to occur at the time the said shaft has been rocked to release said plate holder.

In testimony whereof I have affixed my signature in presence of two witnesses.

JOSEF ROSENTHAL.

Witnesses:
  LOUIS MUELLER,
  MATHILDE K. HELD.